(12) United States Patent
Sheu et al.

(10) Patent No.: US 7,594,841 B2
(45) Date of Patent: Sep. 29, 2009

(54) CARBON NANOTUBE FIELD EMITTER ARRAY AND METHOD FOR FABRICATING THE SAME

(75) Inventors: Jyh-Rong Sheu, Hsinchu (TW); Ching-Hsun Chao, Kaohsiung (TW); Liang-You Jiang, Danshuei Township, Taipei County (TW); Yu-Yang Chang, Tainan (TW); Cheng-Chung Lee, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/857,912

(22) Filed: Jun. 2, 2004

(65) Prior Publication Data

US 2005/0067937 A1 Mar. 31, 2005

(30) Foreign Application Priority Data

Sep. 25, 2003 (TW) .............................. 92126549 A (51) Int. Cl.
*H01J 1/62* (2006.01)
*H01J 63/04* (2006.01)
*H01J 1/02* (2006.01)
*H01J 9/12* (2006.01)

(52) U.S. Cl. ............................ 445/51; 445/24; 313/309; 313/495; 313/483; 313/496; 313/497

(58) Field of Classification Search .................. 313/309
See application file for complete search history.

(56) References Cited

U.S. PATENT DOCUMENTS

| 5,633,560 | A * | 5/1997 | Huang ........................ 313/495 |
| 6,359,383 | B1 * | 3/2002 | Chuang et al. ............... 313/496 |
| 2002/0036452 | A1 * | 3/2002 | Muroyama et al. .......... 313/310 |
| 2002/0094494 | A1 * | 7/2002 | Chung et al. ................. 430/311 |
| 2002/0185949 | A1 * | 12/2002 | Yaniv et al. .................. 313/309 |
| 2003/0044519 | A1 * | 3/2003 | Takai ........................... 445/51 |
| 2003/0090190 | A1 * | 5/2003 | Takai et al. .................. 313/311 |
| 2004/0119396 | A1 * | 6/2004 | Lee et al. ..................... 313/495 |

* cited by examiner

*Primary Examiner*—Nimeshkumar D. Patel
*Assistant Examiner*—Natalie K Walford
(74) *Attorney, Agent, or Firm*—Bacon & Thomas PLLC (57) ABSTRACT

A method for fabricating a carbon nanotube field emitter array is disclosed, which has the steps of (a) providing a substrate; (b) forming a cathode layer having a first pattern on the substrate; (c) forming an opaque insulating layer having a second pattern on the substrate, wherein a predetermined part of the cathode layer is exposed; (d) forming a gate layer having the second pattern on the opaque insulating layer; (e) forming a carbon nanotube layer on the entire top surface of the substrate; and (f) exposing the carbon nanotube layer to a light beam coming from the backside of the substrate.

17 Claims, 7 Drawing Sheets

CARBON NANOTUBE FIELD EMITTER ARRAY AND METHOD FOR FABRICATING THE SAME

BACKGROUND OF THE INVENTION

1. Field of the Invention

The present invention relates to a carbon nanotube field emitter array and method for fabricating the same and, more particularly, to a method that integrates a photomask into the structure of the carbon nanotube field emitter array for fabricating the carbon nanotube field emitter array.

2. Description of Related Art

Figure 1:
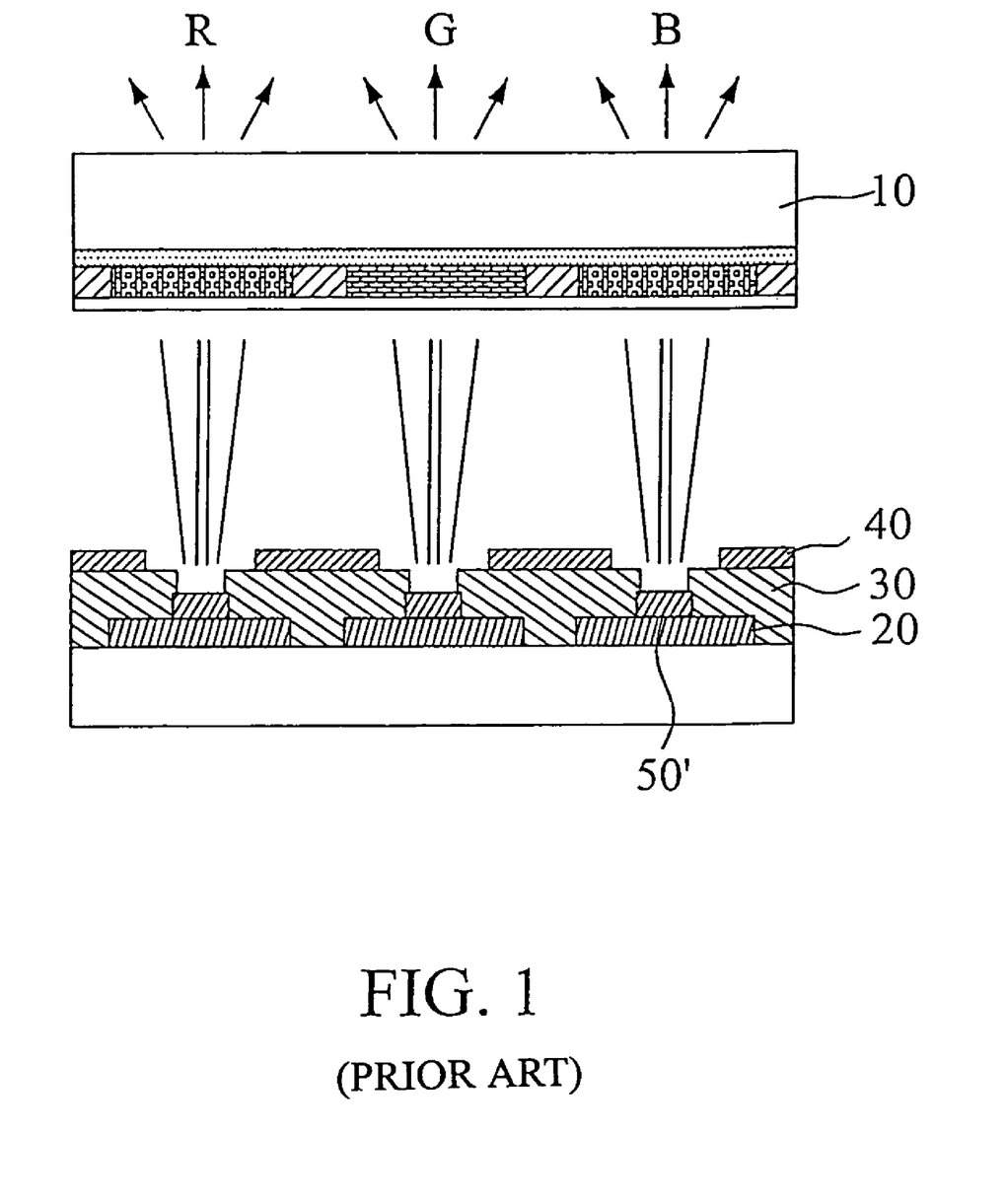
FIG. 1 is a cross-section view showing the triode structure of a carbon nanotube field emission display (CNT-FED)

The triode structure of a carbon nanotube field emission display (CNT-FED) is shown in FIG. 1. The triode structure has the characteristics or advantages of high electron energy, increased illumination efficiency, and low controlling voltage. In the triode structure, the anode electrode increases the energy of the electron, the cathode electrode acts as an electron emitter, and the gate electrode is responsible for drawing the electrons out of the cathode electrode. Currently, the carbon nanotube powder is first mixed with the organic materials to form a paste, which is then coated on a substrate and patterned by screen-printing to form the CNT emitter array of a CNT-FED. However, the size of the CNT emitters formed by the aforesaid method is restricted. Accordingly, the photolithography process may be a preferred method to pattern the CNT emitter array because it is less restricted in the size of the CNT emitters and can control the distance between the CNT emitters and the gate electrode easily, thereby lowering the required driving voltage thereof. However, that leads to another problem of how to carry out the photolithography process in the fabrication of the CNT emitter array successfully.

Generally speaking, the photolithography process uses an independent photomask for patterning an object, so it needs an extremely precise alignment between the photomask and the object when the photolithography process is carried out. However, during the manufacturing of the CNT-FEDs, it is required to carry out a high temperature process, which will cause shrinkage or deformation of the substrate, and therefore raises the difficulty of alignment of the photolithography process.

Figure 2:
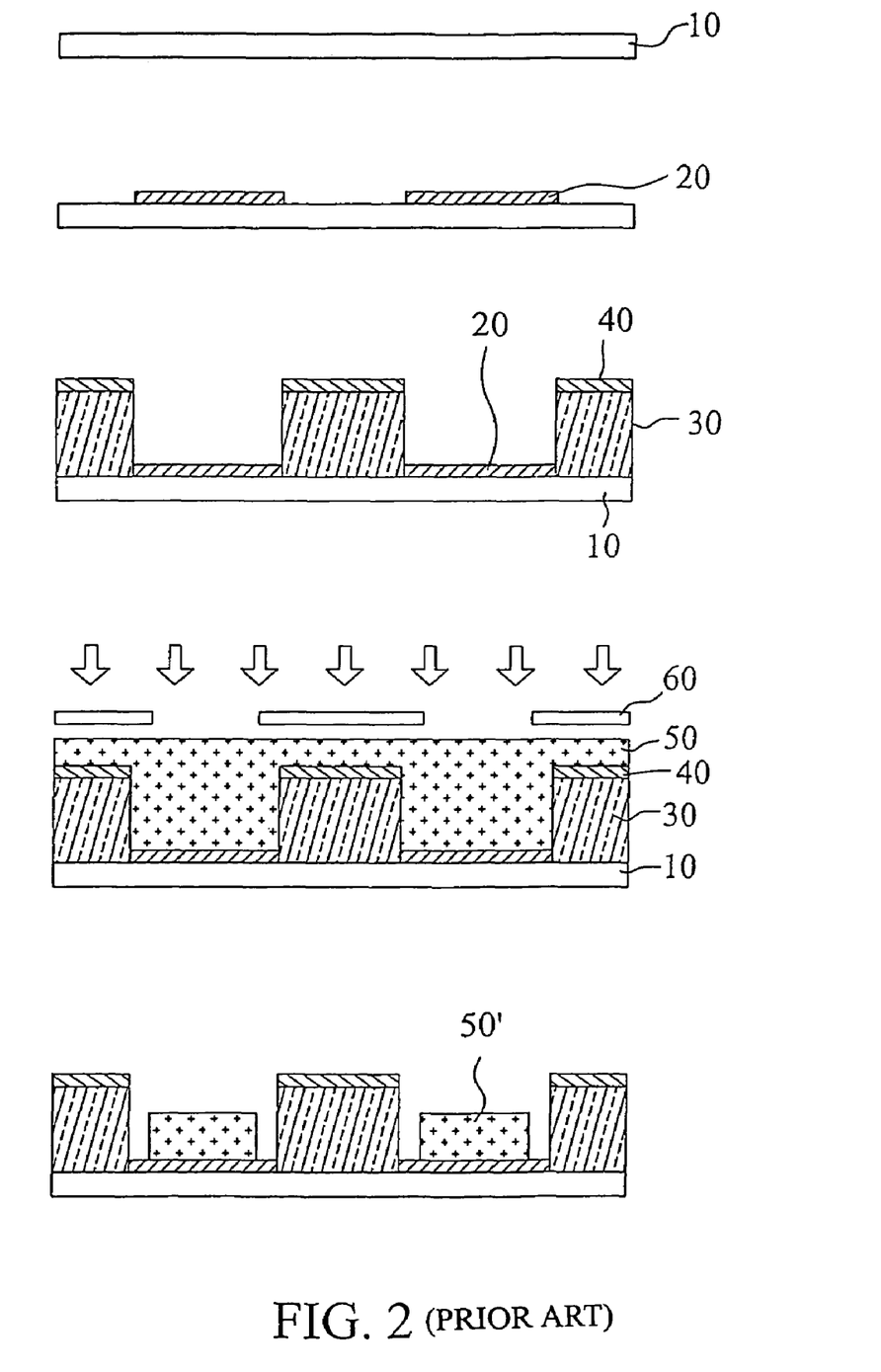
FIG. 2 is a process flow showing the fabrication of a carbon nanotube field emitter array in the prior art.

Currently, the CNT emitter array of the triode structure of a CNT-FED is patterned through obverse exposure of the photosensitive CNT layer, as shown in FIG. 2. On a substrate 10, a cathode layer 20, a dielectric layer 30, and a gate layer 40 are formed in turns. In the meanwhile, a dielectric hole and a gate hole are formed at the same location to expose the cathode layer 20. Afterwards, a CNT layer is coated on the entire top surface of the substrate 10 and then patterned by the photomask 60 to form the CNT emitter 50' on the exposed cathode electrode 20. However, it is necessary to align precisely and repeatedly during the current photolithography process. If the alignment is deviated, a short circuit will easily occur between the cathode layer and the gate layer of the CNT emitter.

To resolve the aforementioned problem, a method of manufacturing a triode carbon nanotube field emitter array is disclosed in US patent application publication 2002/0094494 A1 by Samsung SDI. The method teaches that a transparent hole is formed between a transparent electrode and a metal electrode. The transparent hole is then filled with the CNT paste and patterned by the reverse exposure to form a CNT field emitter. However, such a structure makes the gate electrode act inefficiently on the CNT emitter.

Therefore, it is desirable to provide an improved carbon nanotube field emitter array and method for fabricating the same to mitigate and/or obviate the aforementioned problems.

SUMMARY OF THE INVENTION

The object of the present invention is to provide a method for fabricating a carbon nanotube field emitter array, so that the CNT field emitter array is patterned accurately, the shrinkage or deformation caused by high temperature process is prevented, and the distance between the CNT field emitter and the gate electrode is controlled precisely.

Another object of the present invention is to provide a carbon nanotube field emitter array that has an integrated photomask, so that the CNT field emitter array is easily patterned and fabricated.

To achieve the object, the method for fabricating a carbon nanotube field emitter array of the present invention includes the steps of: (a) providing a substrate; (b) forming a cathode layer having a first pattern on the substrate; (c) forming an opaque insulating layer having a second pattern on the substrate, wherein a predetermined part of the cathode layer is exposed; (d) forming a gate layer having the second pattern on the opaque insulating layer; (e) forming a carbon nanotube layer completely covering a top surface of the substrate; and (f) exposing the carbon nanotube layer to a light beam coming from the backside of the substrate.

To achieve the object, the method for fabricating a carbon nanotube field emitter array of the present invention includes the steps of: (a) providing a substrate; (b) forming an opaque layer having a third pattern on the substrate; (c) forming a cathode layer having a first pattern on the substrate; (d) forming an opaque insulating layer having a second pattern on the substrate, wherein a predetermined part of the cathode layer is exposed; (e) forming a gate layer having the second pattern on the opaque insulating layer; (f) forming a carbon nanotube layer completely covering a top surface of f the substrate; and (g) exposing the carbon nanotube layer to a light beam coming from the backside of the substrate.

To achieve the object, the carbon nanotube field emitter array of the present invention includes a substrate; a cathode layer having a first pattern on the substrate; an opaque insulating layer having a second pattern on the substrate, wherein a predetermined part of the cathode layer is exposed; a gate layer having the second pattern on the opaque insulating layer; and a plurality of carbon nanotube emitters located on the predetermined part of the cathode layer; wherein a plurality of apertures is formed on the predetermined part of the cathode layer.

The substrate of the method for fabricating a carbon nanotube field emitter array of the present invention can be any conventional substrate. Preferably, the substrate is transparent or semi-transparent. The first pattern or the third pattern of the present invention can be any conventional pattern of CNT emitters. Preferably, the first pattern or the third pattern is composed of a plurality of transparent holes that are in shapes of an island or a volcano, or that are or in irregular shapes. The cathode layer of the present invention can be made of any conventional materials. Preferably, the cathode layer is made of silver The exposure of the carbon nanotube layer of the present invention can be carried out by any conventional method. Preferably, the carbon nanotube layer is exposed to an ultraviolet beam or a laser beam. The cathode layer, the opaque insulating layer, the gate layer, and the carbon nanotube layer of the present invention can be formed by any conventional deposition process. Preferably, the cathode layer, the opaque insulating layer, the gate layer, and the carbon nanotube layer are formed by a thick film process. The carbon nanotube field emitter array of the present invention optionally has an opaque layer formed between the substrate and the cathode layer. Preferably, the opaque layer further has a transparent hole.

The method for fabricating a carbon nanotube field emitter array of the present invention integrates a photomask into the structure of the carbon nanotube field emitter array and utilizes the thick film process, such as screen printing or a photolithography process, to form various patterns of carbon nanotube field emitters. The integrated photomask may be an opaque insulating layer combined with a cathode electrode layer, which is formed with predetermined holes. Therefore, after being coated, exposed, and developed, the carbon nanotube layer is patterned to form at least one carbon nanotube emitter in the predetermined holes. The difference between the present invention and the prior art lies in that the triode structure of the present invention may be three layers, composed of the cathode layer, the insulating layer, and the gate electrode layer as illustrated in embodiment 1 below, or four layers, composed of the photomask layer, the cathode layer, the insulating layer, and the gate electrode layer as illustrated in embodiment 2 below. As the photomask is integrated within the structure of the carbon nanotube field emitter array in the present invention, the pattern of the carbon nanotube field emitter array can be changed flexibly. For example, a plurality of carbon nanotube field emitters can be formed in a single hole of the gate electrode. Furthermore, the thick film process can lower the fabrication cost thereof. Because the patterns of the cathode electrode layer and the insulating layer dominate the pattern of the carbon nanotube field emitters, the distance between the gate electrode and the carbon nanotube field emitters is thus controlled, as is the distance between the gate electrode and the cathode electrode. As a result, the gate electric field can easily act on the carbon nanotube field emitters.

The method for fabricating a carbon nanotube field emitter array of the present invention uses less photomask, incurs lower cost, and has fewer limitations on process parameters and line width than the conventional method. Moreover, the advantage of a controllable distance between the gate electrode and the carbon nanotube field emitter as well as that between the gate electrode and the cathode electrode lowers the operation voltage and improves the stability in the power supply. Other objects, advantages, and novel features of the invention will become more apparent from the following detailed description when taken in conjunction with the accompanying drawings.

DETAILED DESCRIPTION OF THE PREFERRED EMBODIMENT

Embodiment 1

Figure 3:
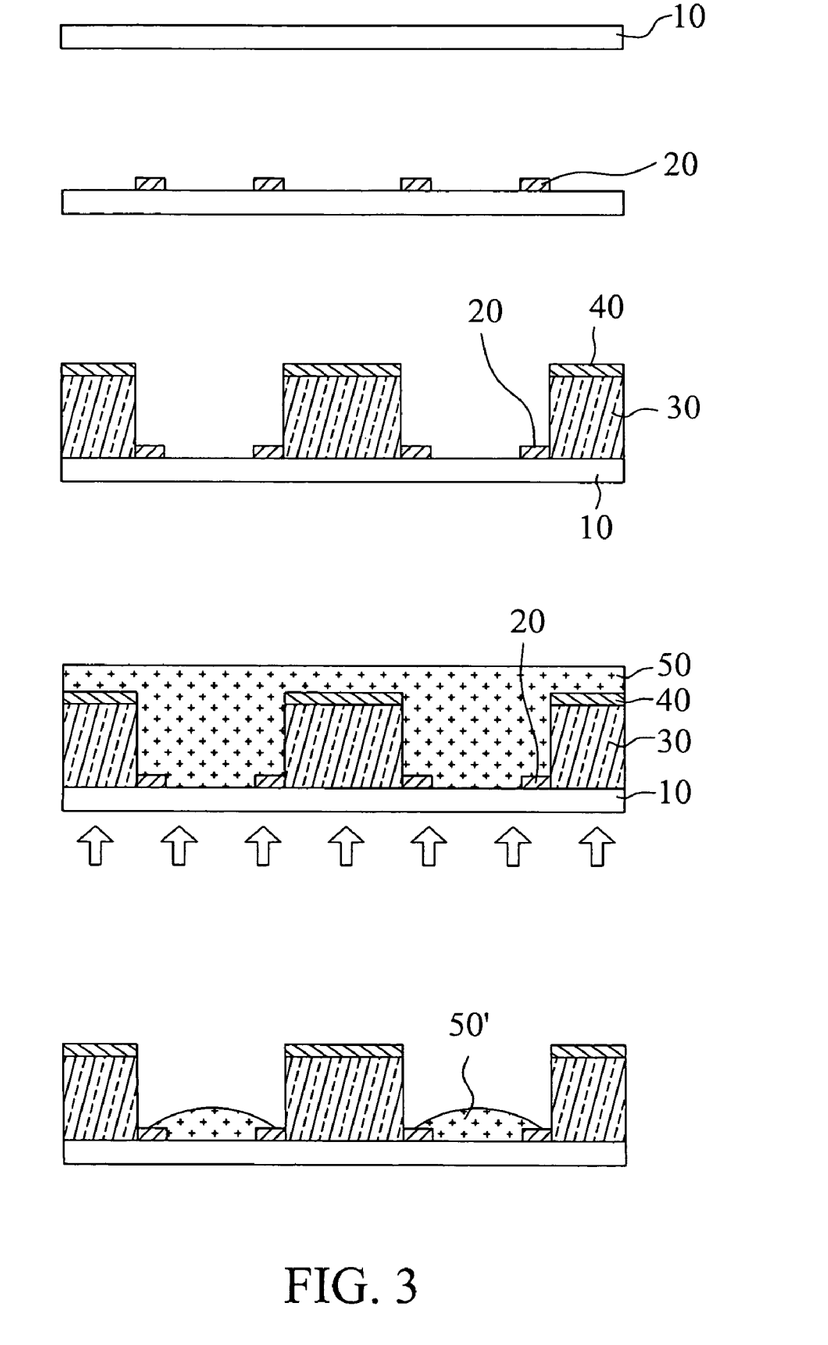
FIG. 3 is a process flow showing the fabrication of a carbon nanotube field emitter array of one preferred embodiment of the present invention.
Figure 6:
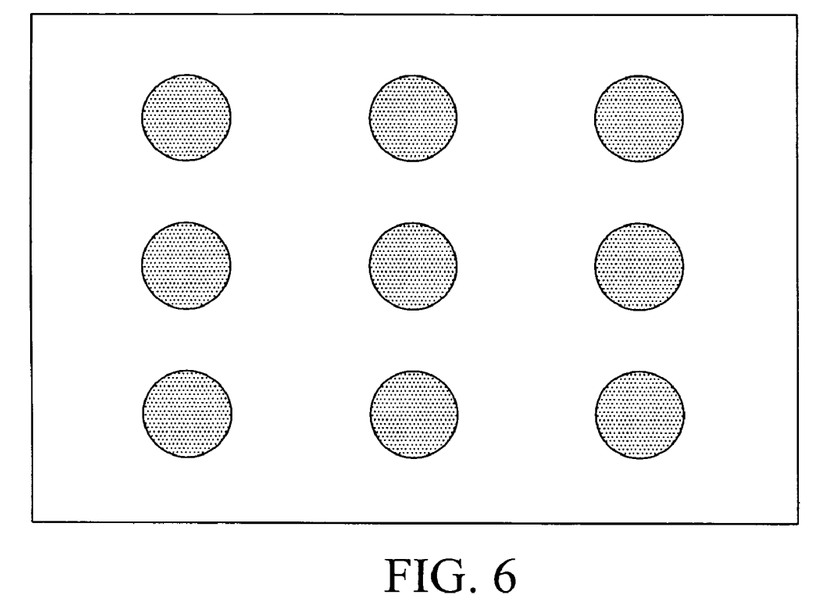
FIG. 6 is a top view showing the carbon nanotube field emitter array of one preferred embodiment of the present invention.

With reference to FIG. 3, a transparent or semi-transparent substrate 10 is provided, and then a thick silver layer is deposited on the substrate 10 by a thick film process and patterned to form a cathode layer 20 having a first pattern. Next, an opaque insulating layer 30 having a second pattern is formed on the substrate 10, wherein a predetermined part of the cathode layer 20 is exposed. Afterwards, a gate layer 40 having the second pattern likewise is formed on the opaque insulating layer 30. A carbon nanotube layer 50 is then coated on the entire top surface of the substrate 10. Finally, the carbon nanotube layer 50 is exposed to a light beam coming from the backside of the substrate 10 and results in a carbon nanotube field emitter 50'. Owing to the properties of the carbon nanotube layer, the carbon nanotube field emitter 50' is mushroom in cross-sectional view, and circular in top view, as shown in FIG. 6.

Embodiment 2

Figure 4:
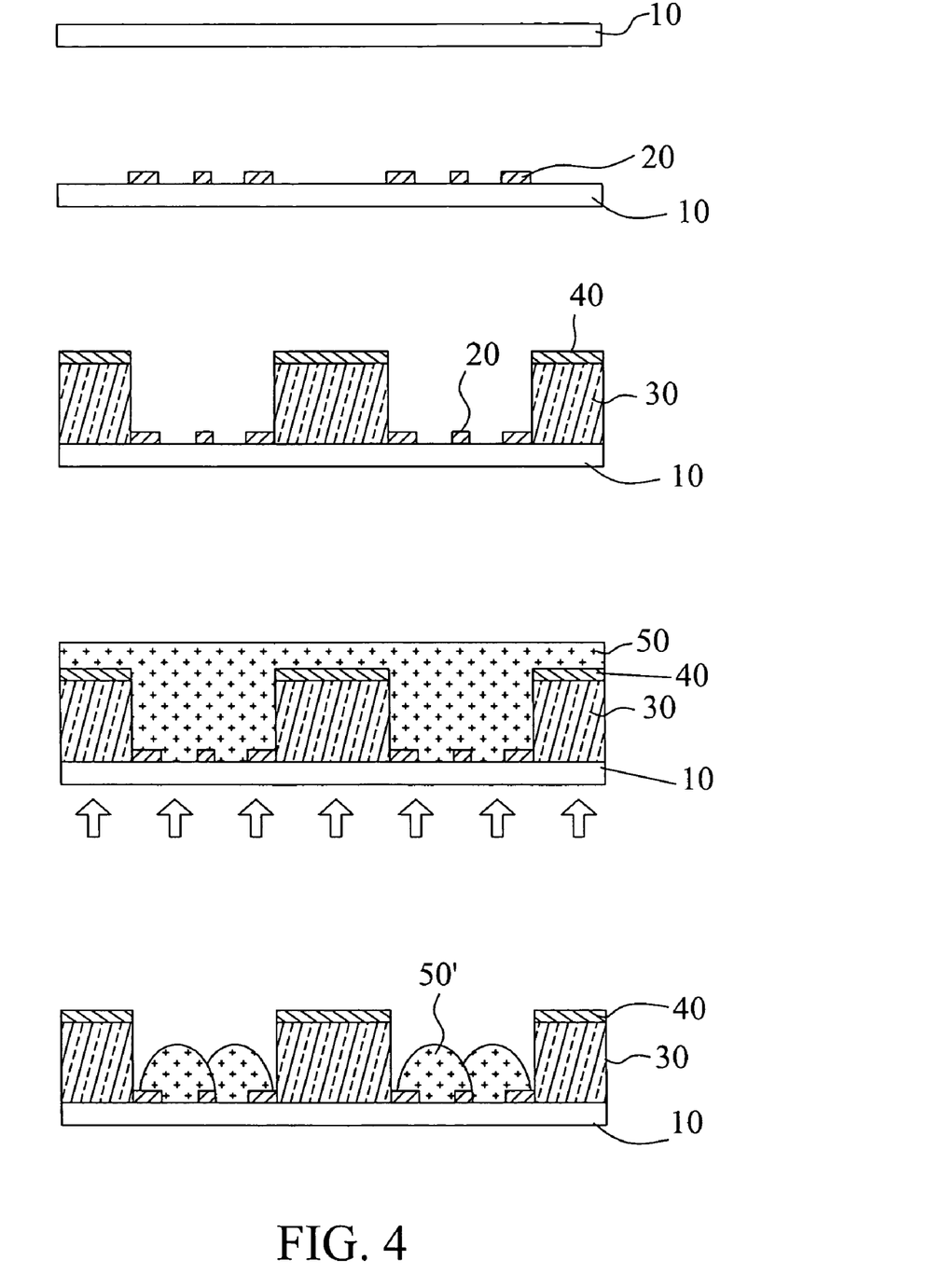
FIG. 4 is a process flow showing the fabrication of a carbon nanotube field emitter array of another preferred embodiment of the present invention.
Figure 7:
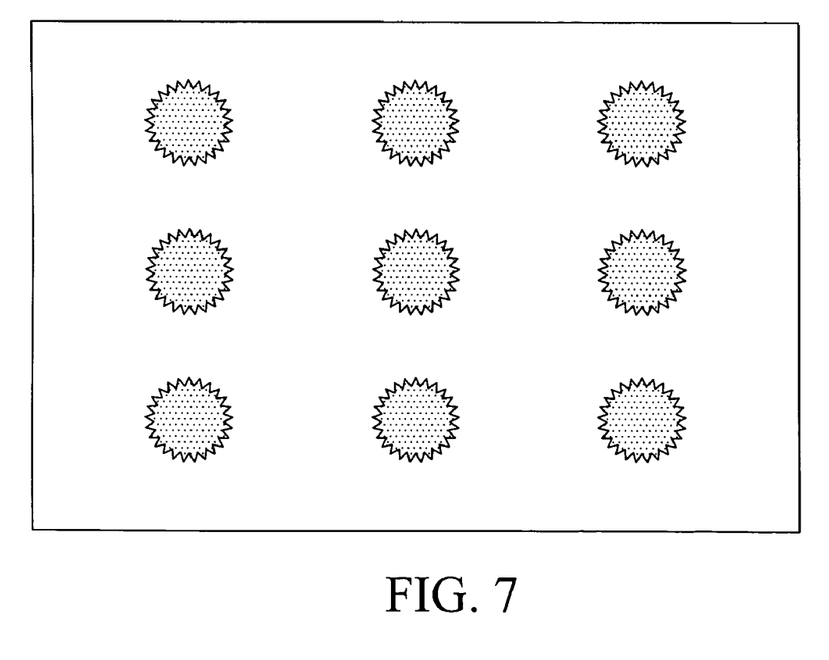
FIG. 7 is a top view showing the carbon nanotube field emitter array of another preferred embodiment of the present invention.

With reference to FIG. 4, a transparent or semi-transparent substrate 10 is provided, and then a thick silver layer is deposited on the substrate 10 by the thick film process and patterned to form a cathode layer 20 having a first pattern. Next, an opaque insulating layer 30 having a second pattern is formed on the substrate 10, wherein a predetermined part of the cathode layer 20 is exposed. Afterwards, a gate layer 40 having the second pattern likewise is formed on the opaque insulating layer 30. A carbon nanotube layer 50 is then coated on the entire top surface of the substrate 10. Finally, the carbon nanotube layer 50 is exposed to a light beam coming from the backside of the substrate 10 and results in a carbon nanotube field emitter 50'. Owing to the slight transparency of the silver cathode layer 20, a plurality of irregular carbon nanotube field emitters 50' is obtained after the exposure treatment, as shown in FIG. 7.

Embodiment 3

Figure 5:
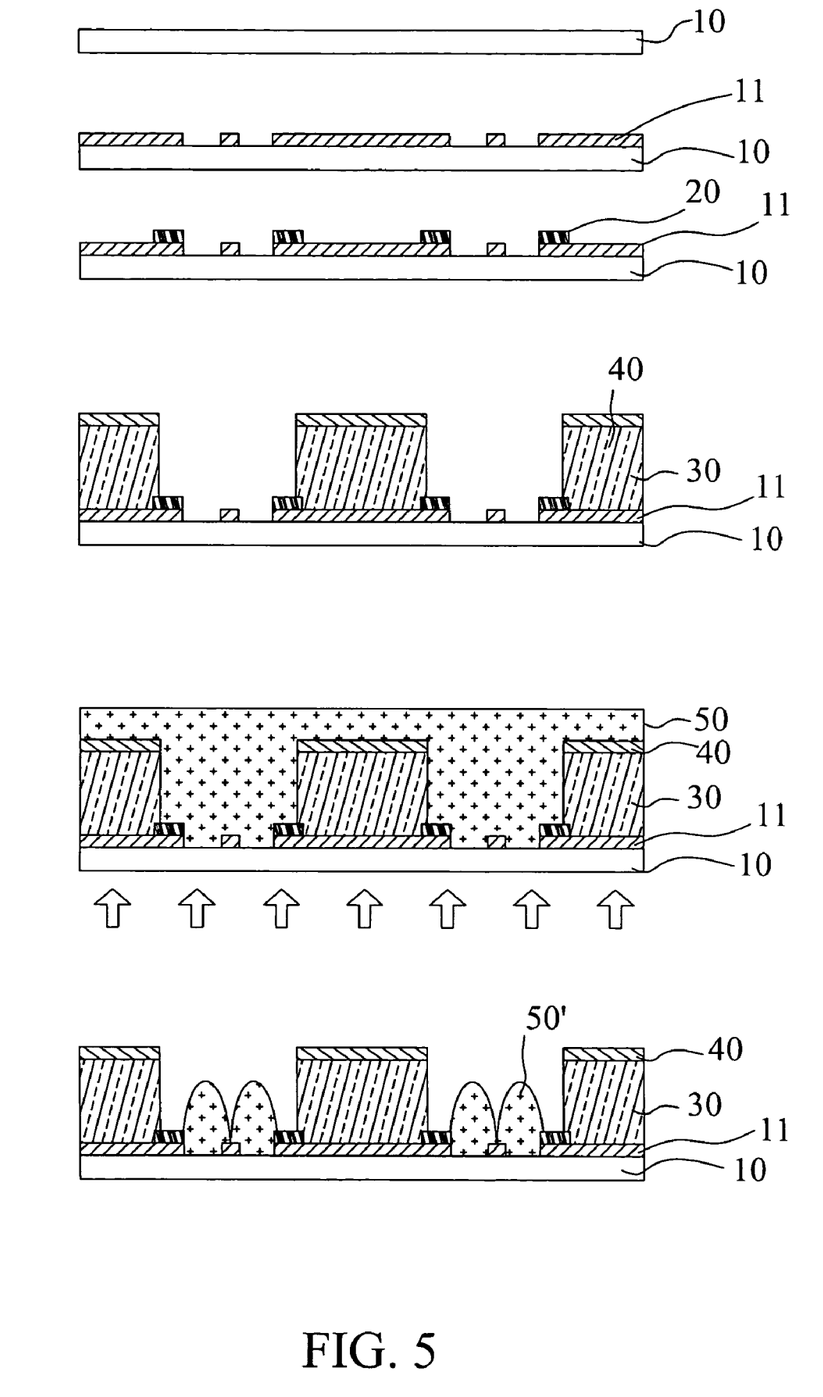
FIG. 5 is a process flow showing the fabrication of a carbon nanotube field emitter array of yet another preferred embodiment of the present invention.
Figure 8:
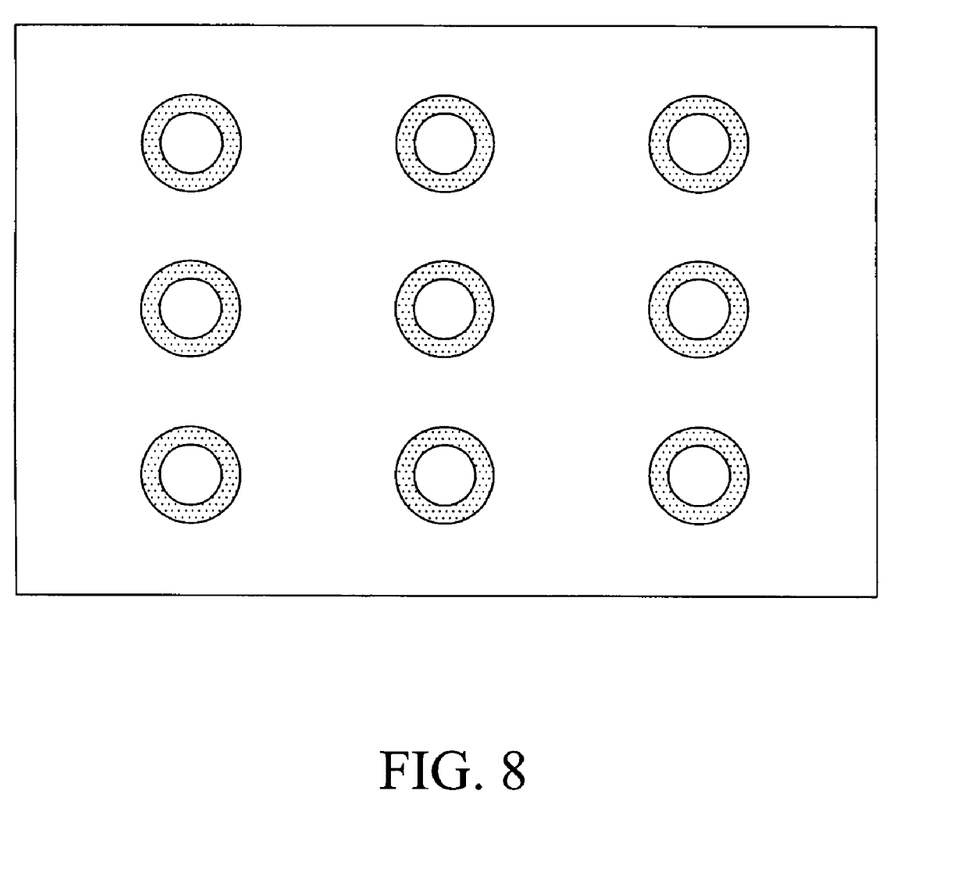
FIG. 8 is a top view showing the carbon nanotube field emitter array of yet another preferred embodiment of the present invention.

The photomask is integrated into the triode structure of the carbon nanotueb field emitter array in the present embodiment, and a four-layer structure is thus formed. With reference to FIG. 5, a transparent or semi-transparent substrate 10 is provided, and then an opaque layer 11 is deposited on the substrate 10. The opaque layer 11 is patterned to form the transparent holes in a volcano shape or a donut shape with the island of the donut shape optionally located in the holes of the cathode layer to be formed in the subsequent step. Afterwards, a silver layer is deposited and patterned to form a cathode layer 20 having a first pattern. Next, an opaque insulating layer 30 having a second pattern is formed on the substrate 10, wherein a predetermined part of the cathode layer 20 is exposed, and then a gate layer 40 having the second pattern likewise is formed on the opaque insulating layer 30. A carbon nanotube layer 50 is then coated on the entire top surface of the substrate 10. Finally, the carbon nanotube layer is exposed to a light beam coming from the backside of the substrate 10 and a carbon nanotube field emitter 50' with a volcano shape is thus obtained. The top view is shown in FIG. 8.

In the embodiment 2 or 3, a plurality of carbon nanotube field emitters can be formed in each hole of the gate layer, so the distance between the carbon nanotube field emitters and the gate electrode can be controlled well. Therefore, the gate electric field can act on the carbon nanotube field emitters easily.

Although the present invention has been explained in relation to its preferred embodiment, it is to be understood that many other possible modifications and variations can be made without departing from the spirit and scope of the invention as hereinafter claimed.

What is claimed is:

1. A method of fabricating a carbon nanotube field emitter array comprising the steps of:
    (a) providing a substrate;
    (b) forming a cathode layer having a first pattern on the substrate, wherein the first pattern is comprised of a plurality of transparent holes that are in shapes of an island or a volcano;
    (c) forming an opaque insulating layer having a second pattern on the substrate, wherein a predetermined part of the cathode layer is exposed and the opaque insulating layer is opaque to ultraviolet light;
    (d) forming a gate layer having the second pattern on the opaque insulating layer;
    (e) forming a carbon nanotube layer completely covering a top surface of the substrate; and
    (f) forming a plurality of carbon nanotube emitters on the substrate and in each of the plurality of transparent holes by exposing the carbon nanotube layer to a light beam coming from a backside of the substrate.

2. The method as claimed in claim 1, wherein the substrate is transparent or semi-transparent.

3. The method as claimed in claim 1, wherein the cathode layer is made of silver.

4. The method as claimed in claim 1, wherein the light beam is an ultraviolet beam or a laser beam in step (f).

5. The method as claimed in claim 1, wherein steps (b), (c), (d), and (e) are carried out through a thick film process.

6. A method of fabricating a carbon nanotube field emitter array comprising the steps of:
    (a) providing a substrate;
    (b) forming an opaque layer having a third pattern on the substrate;
    (c) forming a cathode layer having a first pattern on the opaque layer, wherein the first pattern is comprised of a plurality of transparent holes that are in shapes of an island or a volcano or are in irregular shapes, and the patterned opaque layer is in a shape of an island optionally located in the plurality of transparent holes in the patterned cathode layer;
    (d) forming an opaque insulating layer having a second pattern on the opaque layer, wherein a predetermined part of the cathode layer is exposed;
    (e) forming a gate layer having the second pattern on the opaque insulating layer;
    (f) forming a carbon nanotube layer completely covering a top surface of the substrate; and
    (g) forming a plurality of carbon nanotube emitters in each of the plurality of transparent holes by exposing the carbon nanotube layer to a light beam coming from a backside of the substrate.

7. The method as claimed in claim 6, wherein the substrate is transparent or semi-transparent.

8. The method as claimed in claim 6, wherein the cathode layer is made of silver.

9. The method as claimed in claim 6, wherein the light beam is an ultraviolet beam or a laser beam in step (g).

10. The method as claimed in claim 6, wherein steps (b), (c), (d), (e), and (f) are carried out through a thick film process.

11. A carbon nanotube field emitter array comprising:
    a substrate;
    a cathode layer having a first pattern on the substrate with apertures;
    an opaque insulating layer having a second pattern on the substrate, wherein a predetermined part of the cathode layer is exposed through apertures therein and the opaque insulating layer is opaque to ultraviolet light;
    a gate layer having a second pattern on the opaque insulating layer; and
    a plurality of carbon nanotube emitters located on the predetermined part of the cathode layer.

12. The carbon nanotube field emitter array as claimed in claim 11, further comprising an opaque layer having a third pattern between the substrate and the cathode layer.

13. The carbon nanotube field emitter array as claimed in claim 12, wherein the opaque layer has at least one transparent hole.

14. The carbon nanotube field emitter array as claimed in claim 12, wherein the third pattern is composed of a plurality of transparent holes that are in shapes of an island or a volcano or in irregular shapes, and the patterned opaque layer is in a shape of an island optionally located in the plurality of transparent holes in the cathode layer.

15. The carbon nanotube field emitter array as claimed in claim 11, wherein the substrate is transparent or semi-transparent.

16. The carbon nanotube field emitter array as claimed in claim 11, wherein the cathode is made of silver.

17. The carbon nanotube field emitter array as claimed in claim 11, wherein the plurality of carbon nanotube emitters are formed in a single hole of a gate electrode, the distance between the gate electrode and carbon nanotube field emitters is controlled and the distance between the gate electrode and the cathode layer is controlled.

* * * * *